Dec. 11, 1934.  H. H. B. DEANE  1,984,255
SPRING ARRANGEMENT FOR RESILIENT WHEELS
Filed July 19, 1933

Inventor:
Herbert Henry Branson Deane

Patented Dec. 11, 1934

1,984,255

UNITED STATES PATENT OFFICE 1,984,255

SPRING ARRANGEMENT FOR RESILIENT WHEELS

Herbert Henry Branson Deane, Rugby, England

Application July 19, 1933, Serial No. 681,133
In Great Britain April 14, 1932

2 Claims. (Cl. 152—45)

This invention relates to a resilient wheel of the kind wherein the rim is controlled by a plurality of cushioning members in the form of hollow plungers which are movable, in a direction parallel to the wheel axis, in guides contained in the hub and which bear, under the influence of compression springs protected by the plunger skirts, against concaves carried by the rim portion.

It is difficult, in wheels of this type, to obtain a spring arrangement which will meet the varying conditions of load and road shocks. A single compression spring behind each plunger designed to take heavy loads and road shocks will, unless it is made inordinately large, be incapable of yielding in a satisfactory manner to lighter loads and road shocks. This difficulty arises particularly in the case of driving wheels where the springs have to overcome the torque in addition to the load and the shocks.

The object of the present invention is to produce a spring arrangement which will satisfactorily meet the varying conditions of load and road shocks, and the invention consists in arranging each plunger under the control of a plurality of compression springs which are in different stages of compression and adapted to come successively into operation, each set of spring being rigidly supported at one end and arranged to bear against an anti-friction thrust bearing which will relieve the springs of torsional stresses.

Fig. 1 of the accompanying drawing represents a part section of a wheel hub according to the invention taken along the axis of a pair of coaxial plungers.

Figure 1:
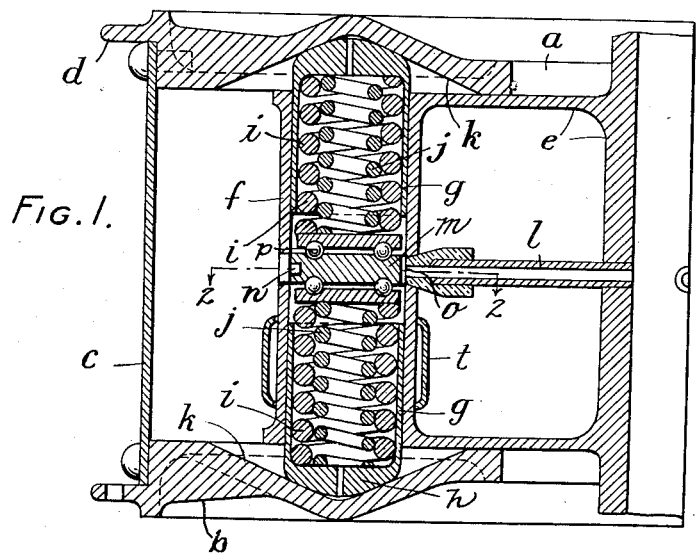
Figure 2:
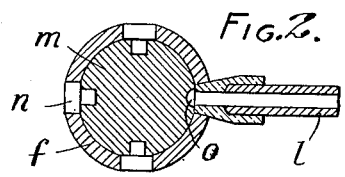
Fig. 2 is a section on the line 2—2 of Fig. 1.

The hub shown in the drawing comprises an outer hub member composed of two parallel, annular discs $a$ provided with strengthening ribs $b$ and interconnected at the periphery by a cylindrical ring $c$. Flanges $d$ are provided whereby the discs may be connected by means of spokes to the wheel rim. There is also an inner hub member $e$ which is connected to the wheel axle or rotatably mounted thereon and which is freely movable within the outer hub portion in a plane at right angles to the axle. The inner hub member is fitted with sleeves $f$ which are parallel or substantially parallel to the axle and which contain each a pair of hollow, slidable plungers having heads $h$ which are pressed by springs in opposite directions against concaves $k$ formed on the discs $a$ and which thus maintain the inner hub member normally in a central position within the outer hub member. Each displacement of the inner hub member within the outer one, whether caused by load on the axle or by shocks on the wheel rim, will require an inward axial displacement of the plungers and will therefore be opposed by the springs which thus take up the shocks.

According to the invention, each plunger is controlled by a plurality of nested coil springs which are in different stages of compression and thus adapted to come successively into operation. In the illustrated arrangement two springs $i$ and $j$ are employed. The inner spring $j$ is normally but slightly if at all compressed and the outer spring $i$ is designed to function practically alone when the vehicle is lightly loaded and under good road conditions. However, at a given displacement of the plungers the inner spring will also come into action, and it will then assist the principal spring in effectively taking up the shocks due to a heavy load or to bad road conditions.

In vehicles intended to carry very heavy loads, a third spring, still less compressed than the second one, may be introduced for assisting in absorbing the most severe shocks. Alternate springs are wound in opposite directions. Lubricant is supplied to the springs and to the plunger heads through ducts $l$.

In order to protect the springs from being loaded beyond their designed limits, the plunger skirts $g$ are adapted to come together after a predetermined compression has been attained. The length of the skirts also determine the normal amount of movement of the plungers within the concaves and thus prevent them from leaving the latter.

Preferably a separate set of springs is provided for each plunger, and a rigid abutment $m$ is therefore fitted in the sleeve $f$ in order to take the thrust of all the springs. The abutment may have the form of a disc which can be secured in position in the sleeve $f$ by means of radial bolts $n$. The disc is provided with a groove $o$ which communicates with the lubricating duct $l$ and which leads the lubricant towards opposite ends of the sleeve $f$.

Under the load of the vehicle, the plungers usually maintain themselves in an eccentric position relative to the concaves, and they will therefore have a tendency to rotate within the sleeves as they travel in a circle about the centres of the cavities. In order to relieve the springs of the torsional stresses thus set up, a ball bearing $p$ is introduced to take the thrust at one end of the spring. Fig. 1 shows the ball bearing introduced between the spring and the abutment $m$.

Figure 3:
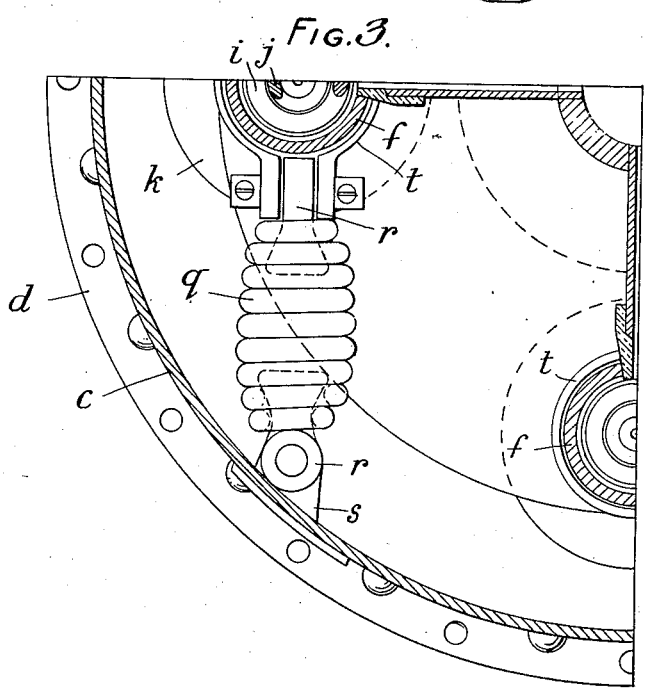
Fig. 3 is a part section of the hub taken across the hub axis.

When the wheel is a driving wheel and the hub therefore has to overcome the torque or turning moment of the drive as well as taking up the road shocks, it is advisable to employ additional springs to deal with the torque, so that the springs $i$ and $j$ will not be impeded in their function of taking up the shocks. The torque springs are in the form of tension springs $q$ which are anchored at the ends to different hub portions as shown in Fig. 3. The springs $q$ may be fitted at the ends with eyelets $r$ whereby they are pivoted at one end to a bracket $s$ connected to a strengthened portion of the rim $c$ and at the other end to a shackle $t$ which surrounds one of the sleeves $f$. Preferably one torque spring is employed for each sleeve.

The wheel may be subjected to the usual, known modifications. For instance, the concaves may be made on separate thrust plates; the discs $a$ may be interconnected and strengthened by bolts or tie rods passing through gaps or slots in the inner hub member; and the hub member $c$ may be made in one piece with the rim or tread and with spokes if such are employed.

I claim:

1. A resilient wheel of the character described, comprising two concentric portions one arranged to slide inside the other in a plane at right angles to the wheel axis, a plurality of slidable and rotatable plungers arranged in the inner wheel portion substantially parallel to the wheel axis and in a projecting position, the outer wheel portion having a concave bearing surface for co-operation with each plunger, a plurality of nested coil springs urging each plunger against its bearing surface, said springs being in different stages of compression and adapted to come successively into operation, a rigid abutment for each set of springs, and an anti-friction thrust bearing introduced between the springs and said rigid abutment.

2. A resilient wheel of the character described, comprising two concentric portions one arranged to slide inside the other in a plane at right angles to the wheel axis, a plurality of slidable and rotatable plungers arranged in the inner wheel portion substantially parallel to the wheel axis and in a projecting position, the outer wheel portion having a concave bearing surface for co-operation with each plunger, a plurality of nested coil springs urging each plunger against its bearing surface, said springs being in different stages of compression and adapted to come successively into operation, a rigid abutment for each set of springs, and an anti-friction bearing arranged to take the thrust of the springs at one end of the set.

HERBERT HENRY BRANSON DEANE.